(No Model.)
C. GRATTAN.
HEADER AND THRASHER.
No. 300,067. Patented June 10, 1884.
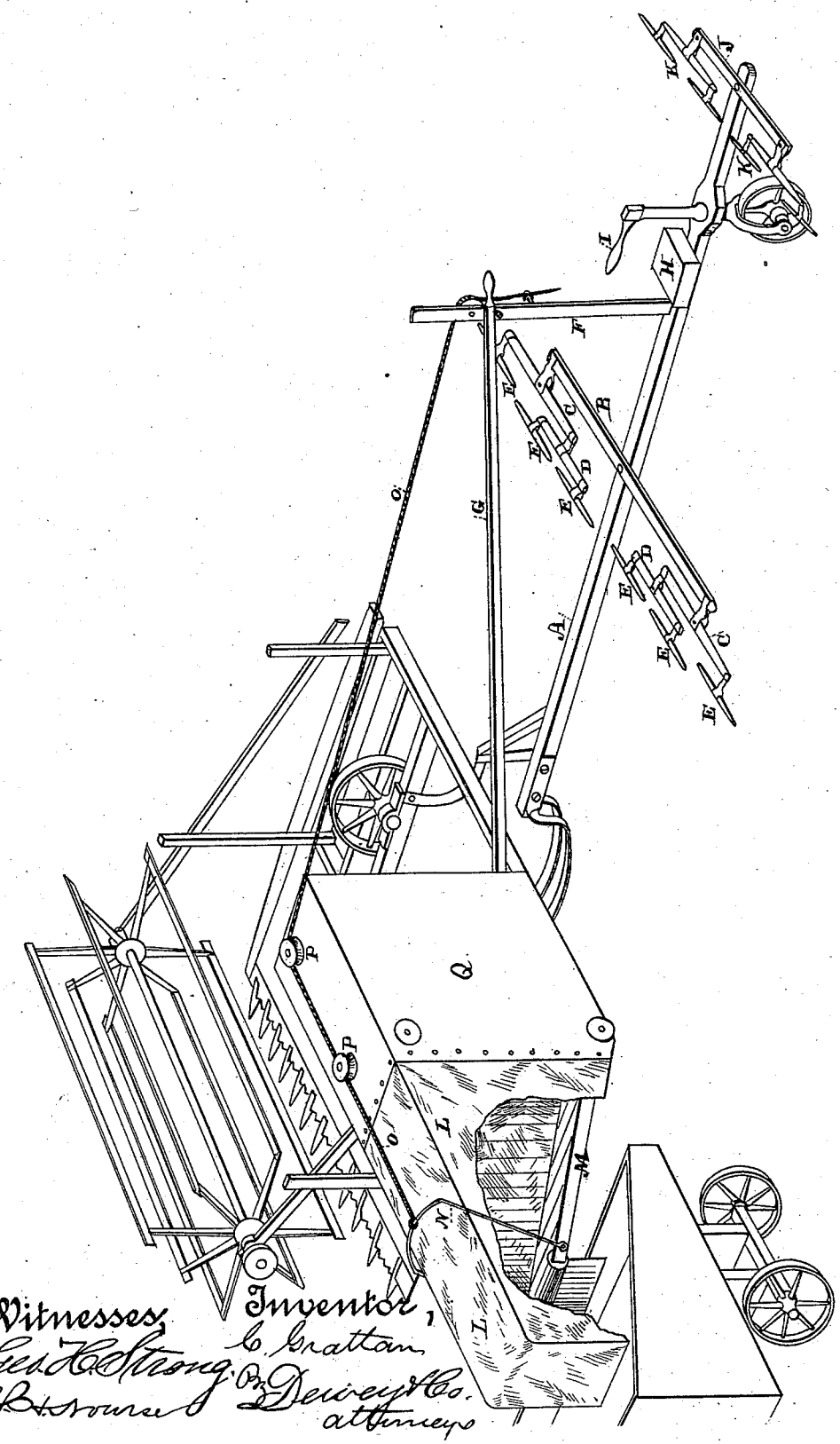

UNITED STATES PATENT OFFICE.

CHRISTOPHER GRATTAN, OF STOCKTON, CALIFORNIA.

HEADER AND THRASHER.

SPECIFICATION forming part of Letters Patent No. 300,067, dated June 10, 1884.

Application filed September 18, 1883. (No model.)

*To all whom it may concern:*

Be it known that I, CHRISTOPHER GRATTAN, of Stockton, county of San Joaquin, and State of California, have invented an Improvement in Header and Thrasher; and I hereby declare the following to be a full, clear, and exact description thereof.

My invention relates to certain improvements in that class of apparatus by which grain is harvested, thrashed, and cleaned in a series of continuous operations performed by a machine which is propelled about the field.

My invention consists in a supplemental carrier-belt to receive and convey the straw and chaff as they escape from the straw-carrier and cleaning-shoe, together with a means for adjusting the same, and a shield or guard and directing-chute, all of which will be more fully explained by reference to the accompanying drawing, which is a perspective view of my apparatus.

A is the pole or push-bar, made sufficiently long to allow two or more ranks of animals to be harnessed to it behind the machine, and one behind the other.

B is the forward cross-bar, pivoted to the pole, and having the levers C and double and single trees D and E attached to it in the usual manner, so that a team of six or eight horses may be driven abreast—half the number upon each side of the pole. Behind the bar B is the post F, with means for holding the lever G, by which the sickle is raised or depressed.

H is a platform for the operator, and I is the lever of the steering-wheel, which is conveniently arranged with reference to the driver's platform. The pole A extends to some distance behind the steering-wheel, and has a second cross-bar, J, with double and single trees K, to which four or more animals may be attached abreast, one-half the number upon each side of the pole, and just behind the forward rank, the heads of this second rank being in such a position relative to the driver that he can attend to and direct them as well as the forward team, while he can at the same time guide the machine and adjust the sickle. This arrangement permits the employment of a large team of animals without spreading them transversely so much that the outside animals will walk in the uncut grain, and the position of the driver relative to the two ranks is such that he can control them much better than if he were placed either behind or before both ranks.

Q is the thrasher and separator, into which the grain is delivered from the harvester portion of the machine. This thrasher and separator has the usual straw-carrier in its upper portion and the separator or cleaning-shoe in its lower portion.

In this class of machines the chaff and straw from the cleaning-shoe and straw-carrier, respectively, are usually discharged at one side, and, if there is any wind, may be blown directly upon the horses and driver. To prevent this I provide the supplemental carrying-belt or draper, M, which is carried by a frame pivoted to the lower part of the thrasher and separator. This belt receives both the straw from the straw-carrier and the chaff from the cleaning-shoe, and discharges them from its upper outer end. I also provide an extension or inclosing-apron, L, of canvas or other suitable material, which may be buttoned or otherwise fastened to the machine, so as to form a continuation beyond and in line with the straw-carrier and cleaning-shoe. The outer end of the shield L falls down in a sort of inclosing cover or spout, so that all the trash will be directed downward and fall upon the ground, being discharged so low that the wind will not blow it upon the driver or horses. In some cases it may be desired to collect this waste and stack it for feeding or other purposes, and it will be necessary to employ a header-wagon, which may be driven beneath this discharge-spout to receive the straw as it falls from it.

In order to regulate the height of the draper M and the discharge-spout, and to raise them as the wagon becomes filled, a bail, N, is secured to the draper-frame, and a rope, O, extends from it around guide-pulleys P, and thence to the post F, where it is secured so as to be within reach of the driver, by whom it is adjusted as desired. By this arrangement the discharge-chute and cover may be regulated at any time.

Having thus described my invention, what I claim as new, and desire to secure by Letters Patent, is—

In a combined header and thrasher having a straw-carrier and cleaning-shoe which discharge at one side, a supplemental carrying-belt and an inclosing hood or cover, with a downwardly-discharging spout, in combination with a suspending-bail, N, operating-rope O, pulleys P P, and a bar, F, secured to the pole A, substantially as herein described.

In witness whereof I have hereunto set my hand.

CHRISTOPHER GRATTAN.

Witnesses:
S. H. NOURSE,
H. C. LEE.